Patented Dec. 5, 1950

2,533,085

UNITED STATES PATENT OFFICE 2,533,085

AMINOHYDROXYBUTENES

Frederick F. Blicke, Ann Arbor, Mich., assignor to Regents of the University of Michigan, Ann Arbor, Mich., a corporation of Michigan No Drawing. Application January 21, 1948, Serial No. 3,542

18 Claims. (Cl. 260—294.7)

The present invention relates to certain aminohydroxybutenes and salts thereof.

The aminohydroxybutenes of the present invention have the following general formula:

X—CH$_2$—Z wherein Z is an alkylamino, dialkylamino, or an N-heterocyclic radical, and wherein X is a hydroxypropenyl radical selected from 1-(3-hydroxy-1-propenyl) and 1-(1-hydroxy-2-propenyl) radicals, which have the formulas:

HO—CH$_2$—CH=CH— and

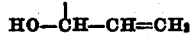

respectively. The aminohydroxybutenes embodying the 1-(3-hydroxy-1-propenyl) radical are designated 1-hydroxy-4-amino-2-butenes and those embodying the 1-(1-hydroxy-2-propenyl) radical, 1-amino-2-hydroxy-3-butenes. The term "alkyl" as employed in "alkylamino" and "dialkylamino," indicates a lower-alkyl radical of straight or branched-chain structure, preferably containing from one to eight carbon atoms, inclusive. Representative alkyl groups are methyl, ethyl, propyl, isopropyl, butyl, isobutyl, tertiary butyl, amyl, n-octyl, and the like. By the term N-heterocyclic radical is to be understood such cyclic radicals as piperidino, 2-methylpiperidino, morpholino, pyrrolidino, and mono- and dimethylpyrrolidino.

These aminohydroxybutenes are useful chemical intermediates in the preparation of esters having pharmaceutical activity as antispasmodics, as well as intermediates in the preparation of analgesics of the Amidone (6-dimethylamino-4,4-diphenyl-3-heptanone hydrochloride) type. The compounds also exhibit some physiological activity per se. Certain advantages accruing to the employment of the dialkylamino compounds make this type the preferred embodiment of the invention.

A general procedure which may be employed in the production of the aminohydroxybutenes involves the reaction of a selected halohydroxybutene, e. g., 1-chloro-2-hydroxy-3-butene, 1-hydroxy-2-chloro-3-butene, or 1-hydroxy-2-bromo-3-butene, and a selected primary or secondary amine or amine hydrohalide. The chlorohydroxybutene and the amine or amine hydrohalide are heated together at or below reflux, e. g., on a steam-bath, for a sufficient reaction period, e. g., three to twenty hours, after which unchanged amine and water are removed under reduced pressure, the product acidified and extracted to remove any neutral material, the acidic solution then made strongly alkaline, and the precipitated oily product finally extracted with ether. As an alternative procedure, the selected amine may be refluxed with 1,2-epoxy-3-butene (also designated 3,4-epoxy-1-butene) in the presence of a catalytic amount of benzenesulfonic acid to yield predominately the 1-amino-2-hydroxy-3-butene compound. These latter compounds are also produced to some extent from 1-hydroxy-2-halo-3-butenes, due, it is believed, to the intermediate formation of 1,2-epoxy-3-butene.

The production of 1-hydroxy-4-amino-2-butenes and 1-amino-2-hydroxy-3-butenes from a 1-hydroxy-2-halo-3-butene was truly an unexpected phenomenon. Apparently an allylic shift of an intermediately formed carbonium ion is responsible for the unexpected production of the 1-hydroxy-4-amino-2-butene, while it is extremely likely that the 1-amino-2-hydroxy-3-butene is formed through an intermediate epoxide, 1,2-epoxy-3-butene, which may be formed by abstraction of hydrogen halide elements from a halohydroxybutene by the basic amine. It is strange to note that apparently none of the expected amine, i. e., a 1-hydroxy-2-amino-3-butene, is obtained from the reaction of the selected amine and the 1-hydroxy-2-halo-3-butene. The reaction was certainly unexpected, and identity of the unpredictable products was established only by hydrogenation to known aminobutanols.

While the aminohydroxybutenes are obtained by the above procedure as high-boiling liquids, the compounds may also be converted to amine salts according to conventional procedure. Thus, for example, the aminohydroxybutenes may be dissolved in absolute ethanol and alcoholic hydrogen bromide added thereto at a low temperature. After removal of the alcohol under reduced pressure, the oily hydrobromide may be rubbed under dry ether to induce crystallization. Other acid salts of the aminohydroxybutenes may be prepared in a similar manner, and such include the hydrochloride, hydrosulphate, acetate, et cetera, as well as quaternary ammonium salts such as the methobromide, methiodide, ethochloride, or ethyl para-toluenesulfonate, which may be prepared by treating the aminohydroxybutenes with a selected alkyl or alkenyl halide or an arylsulfonic ester.

The following examples are given to illustrate the preparation of the compounds of the present invention, but are in no way to be construed as limiting.

Example 1A.—1-diethylamino-2-hydroxy-3-butene. H$_2$C=CH—CHOH—CH$_2$—N(C$_2$H$_5$)$_2$ A mixture of ten grams (0.094 mole) of 1-chloro-2-hydroxy-3-butene (Kadesch, J. Am. Chem. Soc. 68, 44 (1946), wherein it is referred to as 1-chloro-3-butene-2-ol, 15.3 grams (0.21 mole) of diethylamine, and one milliliter of water were refluxed for a period of about nine hours. Unchanged amine was removed under reduced pressure, fifty milliliters of water added, and then concentrated hydrochloric acid until the mixture became acidic. After extraction with ether for the removal of any neutral material, the acidic solution was made strongly alkaline with solid sodium hydroxide, and the precipitated oily product extracted with ether. Removal of solvent from the dried extract gave a product which boiled at 71–72 degrees centigrade at 19 millimeters of mercury pressure absolute, and had an $N_D^{20}$ of 1.4445. The yield of desired product was eleven grams, eighty-one per cent of theory.

*Anal.*—Calcd. for $C_8H_{17}ON$: N, 9.78 per cent. Found: N, 9.47 per cent.

The hydrochloride of the above compound, prepared by passing anhydrous HCl into an ether solution of the free amine at about zero degrees centigrade and rubbing to induce crystallization, melts at 86–88 degrees centigrade.

*Anal.*—Calcd. for $C_8H_{18}ONCl$: Cl⁻, 19.77 per cent; N, 7.79 per cent. Found: Cl⁻, 19.57 per cent; N, 7.42 per cent.

*Example 1B.*—*1-diethylamino-2-hydroxy-3-butene*, $H_2C=CH-CHOH-CH_2-N(C_2H_5)_2$ A mixture of 14.0 grams of 1,2-epoxy-3-butene (0.20 mole), two milliliters of water, 28.6 grams (0.40 mole) of diethylamine and 1.0 gram (0.006 mole) of benzenesulfonic acid were refluxed for three hours, the unchanged amine removed by distillation, and the residue fractionated to yield 1-diethylamino-2-hydroxy-3-butene boiling at 71–72 degrees centigrade at 19 millimeters of mercury pressure absolute in a yield of 24.0 grams, or 85 per cent of theory.

The methiodide of 1-diethylamino-2-hydroxy-3-butene was prepared and found to melt at 103–104 degrees centigrade, and the allylobromide melted at 123–126 degrees centigrade.

*Example 2.*—*1-hydroxy-4-diethylamino-2-butene*, $HOH_2C-CH=CH-CH_2-N(C_2H_5)_2$ A mixture of 60.0 grams of 1-hydroxy-2-chloro-3-butene (0.57 mole) and 120.0 grams (1.71 moles) of anhydrous diethylamine were refluxed on a steam-bath for seventeen hours. The mixture was then treated as described above under Example 1A. The product boiled at 86–89 degrees centigrade at four millimeters of mercury pressure absolute and had an $N_D^{20}$ of 1.4700. The yield of product was 57.0 grams, 70 per cent of theory. Proof of structure was obtained by hydrogenation to the known 4-diethylaminobutanol.

*Anal.*—Calcd. for $C_8H_{17}ON$: C, 67.13; H, 11.88; N, 9.78. Found: C, 66.80; H, 11.86; N, 9.35.

The hydrobromide melted at 82–84 degrees centigrade while the methiodide melted at 58–60 degrees centigrade.

*Example 3.*—*1-piperidino-2-hydroxy-3-butene*, $H_2C=CH-CHOH-CH_2-NC_5H_{10}$

A mixture of 35.0 grams (0.50 mole) of 1,2-epoxy-3-butene, 85.0 grams (1 mole) of piperidine, 2.5 grams of benzenesulfonic acid and 3 milliliters of water was refluxed for four hours. The material was fractionated and the portion boiling at 67–68 degrees centigrade at 4 millimeters of mercury collected. The yield was 67 grams or 86 per cent.

*Anal.*—Calcd. for $C_9H_{17}ON$: N, 9.02. Found: N, 8.88.

*Example 4.*—*1-hydroxy-4-piperidino-2-butene*, $HOH_2C-CH=CH-CH_2-NC_5H_{10}$

A mixture of 50 grams (0.47 mole) of 1-hydroxy-2-chloro-3-butene and 128 grams (1.5 moles) of piperidine was heated on a steam-bath for one hour. The precipitated piperidine hydrochloride was removed by filtration, washed with dry ether, and the ether added to the filtrate. Upon fractionation of the filtrate, 21 grams of distillate, boiling at 68–102 degrees centigrade, and containing the isomeric 1-piperidino-2-hydroxy-3-butene, was collected. The desired 1-hydroxy-4-piperidino-2-butene boiled at 102–105 degrees centigrade at 3 millimeters of mercury pressure.

*Anal.*—Calcd. for $C_9H_{17}ON$: N, 9.02. Found: N, 8.60.

The methiodide melted at 84–86 degrees centigrade.

*Example 5.*—*1-hydroxy-4-dimethylamino-2-butene*, $HOH_2C-HC=CH-CH_2-N(CH_3)_2$ 1-hydroxy-2-chloro-3-butene (42.8 grams, 0.4 mole) was placed in a citrate bottle and cooled with a Dry-Ice and acetone mixture. After addition of 54.0 grams (1.2 moles) of cold dimethylamine, the mixture was allowed to remain at room temperature for twelve hours, and then heated at 80 degrees centigrade for two days. The precipitated dimethylamine hydrochloride was removed by filtration and the residue distilled. The fraction boiling at 33–36 degrees centigrade at 4 millimeters of mercury (19 grams) was 1-dimethylamino-2-hydroxy-3-butene. The desired 1-hydroxy-4-dimethylamino-2-butene boiled at 72–73 degrees centigrade at 4 millimeters of mercury pressure and had an $N_D^{20}$ of 1.4633. Proof of structure was obtained by hydrogenation to the known 4-dimethylamino butanol.

*Anal.*—Calcd. for $C_6H_{13}ON$: N, 12.17. Found: N, 12.05.

*Example 6.*—*1-dimethylamino-2-hydroxy-3-butene*, $H_2C=CH-CHOH-CH_2-N(CH_3)_2$ A mixture of 23.4 grams (0.334 mole) of 1,2-epoxy-3-butene and 85.0 grams (1.03 moles) of a solution of dimethylamine hydrochloride in 20 milliliters of water was placed in a citrate bottle and cooled in an ice-bath. Forty grams of sodium hydroxide, dissoved in 40 milliliters of water, was added and the mixture cooled for one hour and then allowed to come to room temperature. After one-half hour at room temperature, the mixture was heated on a steam-bath for four hours. The precipitated sodium chloride was removed by filtration, washed with a small amount of water, the filtrate cooled and made strongly alkaline with solid sodium hydroxide. The upper organic layer was separated and the aqueous layer extracted with ether. The combined organic layers were dried and the solvent removed to yield 1-dimethylamino-2-hydroxy-3-butene, boiling at 67–68 degrees centigrade at 32 millimeters of mercury pressure. The yield was 24 grams or 62 per cent.

*Anal.*—Calcd. for C$_6$H$_{13}$ON: N, 12.17. Found: N, 11.96.

The hydrobromide of 1-dimethylamino-2-hydroxy-3-butene was prepared by adding 37 millimeters of 1.35 molar alcoholic hydrogen bromide to 5.75 grams (0.05 mole) of the free amine. The alcohol was removed under reduced pressure and the oily residue rubbed under dry ether, whereupon the hydrobromide crystallized. The hydrobromide melted at 90–92 degrees centigrade after recrystallization from acetone.

*Anal.*—Calcd. for C$_6$H$_{14}$ONBr: Br$^-$, 40.76. Found: Br$^-$, 40.67.

*Example 7.—1-ethylamino-2-hydroxy-3-butene,*

$$H_2C=CH-CHOH-CH_2-NH(C_2H_5)$$

A mixture of 35.0 grams (0.50 mole) of 1,2-epoxy-3-butene, 1 mole of ethylamine, 2.5 grams of benzenesulfonic acid and 3 milliliters of water is refluxed for four hours, the material fractionated, and 1-ethylamino-2-hydroxy-3-butene separated therefrom in a yield of about 60 per cent.

Still other amines which may be reacted with 1-halo-2-hydroxy-3-butenes to yield 1-amino derivatives are methylamine, propylamine, isopropylamine, butylamine, amylamine and octylamine, which yield 1-methylamino-2-hydroxy-3-butene, 1-propylamino-2-hydroxy-3-butene, 1-isopropylamino-2-hydroxy-3-butene, 1-butylamino-2-hydroxy-3-butene, 1-amylamino-2-hydroxy-3-butene, and 1-octylamino-2-hydroxy-3-butene, respectively. These monoalkylamines may also be reacted with a 1-hydroxy-2-halo-3-butene to give respectively 1-hydroxy-4-methylamino-2-butene, 1-hydroxy-4-propylamino-2-butene, 1-hydroxy-4-isopropylamino-2-butene, 1-hydroxy-4-butylamino-2-butene, 1-hydroxy-4-amylamino-2-butene, and 1-hydroxy-4-octylamino-2-butene.

N-heterocyclic amines which may be reacted with a 1-halo-2-hydroxy-3-butene to yield 1-heteroamino derivatives are piperidine, 2-methylpiperidine, morpholine, pyrrolidine, 3-methylpyrrolidine, or 3,5-dimethylpyrrolidine, which yield 1-piperidino-2-hydroxy-3-butene, 1-(2-methylpiperidino)-2-hydroxy-3-butene, 1-morpholino-2-hydroxy-3-butene, 1-pyrrolidino-2-hydroxy-3-butene, 1-(3-methylpyrrolidino)-2-hydroxy-3-butene, and 1-(3,5-dimethylpyrrolidino)-2-hydroxy-3-butene, respectively. These N-heterocyclic amines may also be reacted with a 1-hydroxy-2-halo-3-butene to give respectively 1-hydroxy-4-piperidino-2-butene, 1-hydroxy-4-(2-methylpiperidino)-2-butene, 1-hydroxy-4-morpholino-2-butene, 1-hydroxy-4-pyrrolidino-2-butene, 1-hydroxy-4-(3-methylpyrrolidino)-2-butene, and 1-hydroxy-4-(3,5-dimethylpyrrolidino)-2-butene. Likewise, many other amines may be reacted with a 1-halo-2-hydroxy-3-butene or 1-hydroxy-2-halo-3-butene to produce the corresponding 1-amino-2-hydroxy-3-butene or 1-hydroxy-4-amino-2-butene.

Other compounds which are prepared from a selected dialkylamine and the chosen 1-hydroxy-2-halo-3-butene, 1-halo-2-hydroxy-3-butene, or 1,2-epoxy-3-butene include 1-hydroxy-4-dipropylamino-2-butene, 1-hydroxy-4-diisopropylamino-2-butene, 1-hydroxy-4-dibutylamino-2-butene, 1-hydroxy-4-diamylamino-2-butene, 1-hydroxy-4-dioctylamino-2-butene, 1-dipropylamino-2-hydroxy-3-butene, 1-diisopropylamino-2-hydroxy-3-butene, 1-dibutylamino-2-hydroxy-3-butene, 1-diamylamino-2-hydroxy-3-butene, 1-dioctylamino-2-hydroxy-3-butene, and the like.

Various modifications may be made in the present invention without departing from the spirit or scope thereof, and it is to be understood that I limit myself only as defined in the appended claims.

I claim:

1. A compound of the group consisting of (a) 1-amino-2-hydroxy-3-butenes having the general formula $$H_2C=CH-CHOH-CH_2-Z$$

(b) 1-hydroxy-4-amino-2-butenes having the general formula $$HOH_2C-CH=CH-CH_2-Z$$

in both of which formulae Z is a radical of the group consisting of alkylamino, dialkylamino, piperidino, 2-methylpiperidino, morpholino, pyrrolidino, monomethylpyrrolidino and dimethylpyrrolidino radicals, and (c) acid and quaternary ammonium salts thereof.

2. A 1-amino-2-hydroxy-3-butene having the formula $$H_2C=CH-CHOH-CH_2N(alkyl)_2$$

3. A 1-hydroxy-4-amino-2-butene having the formula $$HOCH_2-CH=CH-CH_2-N(alkyl)_2$$

4. 1-hydroxy-4-diethylamino-2-butene.
5. 1-dimethylamino-2-hydroxy-3-butene.
6. 1-hydroxy-4-dimethyamino-2-butene.
7. 1-piperidino-2-hydroxy-3-butene.
8. 1-hydroxy-4-piperidino-2-butene.
9. A process which comprises heating together a 1-hydroxy-2-halo-3-butene with an amine of the group consisting of alkylamines, dialkylamines, piperidine, 2-methylpiperidine, morpholine, pyrrolidine, monomethylpyrrolidines and dimethylpyrrolidines.

10. A process for the production of a 1-amino-2-hydroxy-3-butene having the formula $$H_2C=CH-CHOH-CH_2N(alkyl)_2$$

which comprises heating together a 1-hydroxy-2-halo-3-butene with a dialkylamine.

11. A process for the production of a 1-hydroxy-4-amino-2-butene having the formula $$HOCH_2-CH=CH-CH_2-N(alkyl)_2$$

which comprises heating together a 1-hydroxy-2-halo-3-butene with a dialkylamine.

12. A process for the production of a 1-hydroxy-4-amino-2-butene which comprises heating together a 1-hydroxy-2-halo-3-butene with an amine of the group consisting of alkylamines, dialkylamines, piperidine, 2-methylpiperidine, morpholine, pyrrolidine, monomethylpyrrolidines and dimethylpyrrolidines.

13. A process for the production of 1-hydroxy-4-diethylamino-2-butene which comprises heating together 1-hydroxy-2-chloro-3-butene with diethylamine and recovering the 1-hydroxy-4-diethylamino-2-butene from the product.

14. A process for the production of 1-hydroxy-4-piperidino-2-butene which comprises heating together 1-hydroxy-2-chloro-3-butene with piperidine and recovering the 1-hydroxy-4-piperidino-2-butene from the product.

15. A process for the production of 1-hydroxy-4-dimethylamino-2-butene which comprises heating together 1-hydroxy-2-chloro-3-butene with dimethylamine and recovering the 1-hydroxy-4-dimethylamino-2-butene from the product.

16. A process for the production of a 1-amino-2-hydroxy-3-butene which comprises heating together a 1-hydroxy-2-halo-3-butene with an amine of the group consisting of alkylamines, dialkylamines, piperidine, 2-methylpiperidine, morpholine, pyrrolidine, monomethylpyrrolidines and dimethylpyrrolidines.

17. A process for the production of 1-dimethylamino-2-hydroxy-3-butene which comprises heating together 1-hydroxy-2-chloro-3-butene with dimethylamine and recovering the 1-dimethylamino-2-hydroxy-3-butene from the product.

18. A process for the production of 1-piperidino-2-hydroxy-3-butene which comprises heating together 1-hydroxy-2-chloro-3-butene with piperidine and recovering the 1-piperidino-2-hydroxy-3-butene from the product.

FREDERICK F. BLICKE.

REFERENCES CITED

The following references are of record in the file of this patent:

UNITED STATES PATENTS

| Number | Name | Date |
| --- | --- | --- |
| 2,119,802 | Westphal et al. | June 7, 1938 |
| 2,136,177 | Carothers et al. | Nov. 8, 1938 |

OTHER REFERENCES

Kimizima et al.: Chem. Abstracts, vol. 33, p. 3781 (1939).

Deux: Chem. Abstracts, vol. 36, p. 1307 (1942).